US009600867B2

(12) United States Patent
Koehler

(10) Patent No.: US 9,600,867 B2
(45) Date of Patent: Mar. 21, 2017

(54) IMAGE PROCESSING APPARATUS AND METHOD FOR FILTERING AN IMAGE

(71) Applicant: KONINKLIJKE PHILIPS N.V., Eindhoven (NL)

(72) Inventor: Thomas Koehler, Norderstedt (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/650,901

(22) PCT Filed: Dec. 12, 2013

(86) PCT No.: PCT/IB2013/060852
§ 371 (c)(1),
(2) Date: Jun. 10, 2015

(87) PCT Pub. No.: WO2014/097065
PCT Pub. Date: Jun. 26, 2014

(65) Prior Publication Data
US 2015/0317777 A1 Nov. 5, 2015

Related U.S. Application Data

(60) Provisional application No. 61/740,509, filed on Dec. 21, 2012.

(51) Int. Cl.
*G06K 9/40* (2006.01)
*G06T 5/00* (2006.01)
(Continued)

(52) U.S. Cl.
CPC ............... *G06T 5/002* (2013.01); *G06T 5/20* (2013.01); *G06T 5/50* (2013.01);
(Continued)

(58) Field of Classification Search
CPC . G06T 2207/10081; G06T 2207/20028; G06T 2207/20221; G06T 2207/30004; G06T 5/002; G06T 5/20; G06T 5/50
See application file for complete search history.

(56) References Cited

U.S. PATENT DOCUMENTS 8,233,062 B2   7/2012 Mitsuya et al.
8,660,328 B2*  2/2014 Jarisch .................. G06T 11/006
                                                       382/131
(Continued)

FOREIGN PATENT DOCUMENTS

WO      2011145040 A1   11/2011

OTHER PUBLICATIONS

Llopart, X., et al.; First test measurement of a 64k pixel readout chip working in single photon counting mode; 2003; Nuclear Instruments and Methods in Physics Research; A509:157-163.

(Continued)

*Primary Examiner* — Phuoc Tran

(57) ABSTRACT

The present invention relates to an image processing apparatus for filtering an image. Said apparatus comprises an image input (3) for obtaining a first and a second image of the same object, the first and second images comprising a plurality of voxels and being interrelated by a noise covariance, each voxel having a voxel value including a signal value and a noise value. A joint bilateral filter (3) is provided for filtering the first image, wherein a first voxel of the first image is filtered by a filter function including a relative voxel-specific weight, said weight including a likelihood of obtaining the voxel values of said first voxel and a second voxel in the first image and of a first voxel and a second voxel in the second image, assuming that the signal value of said first voxel of the first image is identical to the signal value of a second voxel of the first image and that the signal value of the first voxel of the second image is identical to the (Continued)

signal value of a second voxel of the second image. Said filtered image is provided at an image output (4).

20 Claims, 4 Drawing Sheets

(51) Int. Cl.
G06T 5/20 (2006.01)
G06T 5/50 (2006.01)
(52) U.S. Cl.
CPC ........... *G06T 2207/10081* (2013.01); *G06T 2207/20028* (2013.01); *G06T 2207/20221* (2013.01); *G06T 2207/30004* (2013.01)

(56) References Cited

U.S. PATENT DOCUMENTS

| | | | |
|---|---|---|---|
| 2006/0251304 A1* | 11/2006 | Florin | G06T 7/0083 382/128 |
| 2008/0253504 A1 | 10/2008 | Proksa | |
| 2009/0285480 A1 | 11/2009 | Bennett et al. | |
| 2011/0064292 A1 | 3/2011 | Chen et al. | |
| 2012/0099702 A1 | 4/2012 | Engel et al. | |
| 2012/0134561 A1 | 5/2012 | Xu et al. | |
| 2012/0177274 A1 | 7/2012 | Koehler et al. | |
| 2013/0064469 A1 | 3/2013 | Koehler et al. | |
| 2013/0202177 A1* | 8/2013 | Bar-Aviv | G06T 11/008 382/131 |

OTHER PUBLICATIONS

Llopart, X., et al.; Medipix2: a 64-k Pixel Readout Chip With 55-um Square Elements Working in Single Photon Counting Mode; 2002; IEEE Trans. on Nuclear Science; 49(5)2279-2283.

Paris, S., et al.; A Gentle Introduction to Bilateral Filtering and its Applications; 2007; ACM SIGGRAPH Courses; pp. 1-45.

Weitkamp, T., et al.; X-ray phase imaging with a grating interferometer; 2005; Optics Express; 13(16)6296-6304.

Wunderlich, A., et al.; Image Covariance and Lesion Detectability in Direct Fan-Beam X-Ray Computed Tomography; 2008; Phys. Med. Biol.; 53(10)2471-2493.

* cited by examiner

IMAGE PROCESSING APPARATUS AND METHOD FOR FILTERING AN IMAGE

CROSS REFERENCE TO RELATED APPLICATIONS

This application is a national filing of PCT application Serial No. PCT/IB2013/060852, filed Dec. 12, 2013, published as WO 2014/097065 A1 on Jun. 26, 2014, which claims the benefit of U.S. provisional application Ser. No. 61/740,509 filed Dec. 21, 2012, which is incorporated herein by reference.

FIELD OF THE INVENTION

The present invention relates to an image processing apparatus and a corresponding method for filtering an image.

BACKGROUND OF THE INVENTION

There are new imaging modalities emerging which provide not just a single image of the patient or the object, but two or more of them in exactly the same geometry. Two examples for this are differential phase contrast imaging (DPCI; e.g. described in US 2012/0099702 A1), where the real and imaginary part of the complex refractive index are measured, and spectral CT (e.g. described in US 2008/0253504 A), where the x-ray attenuation due to the photoelectric effect, Compton scattering, and possibly due to contrast agents are recovered.

In WO 2011/145040 A1 joint bilateral filtering has been proposed as a generalization of the well-known bilateral filter for image based de-noising. In particular, an image processing apparatus is described comprising an image providing unit for providing a first image of an object and a second image of the same object and a filtering unit which filters the first image depending on a first degree of similarity between image values of the first image and on a second degree of similarity between image values of the second image. This allows filtering the first image depending on the likeliness that image values belong to the same part of the object, for example, to tissue or to bone material of the object, if the object is a human being or an animal, even if due to noise the image values of one of the first image and the second image are disturbed, thereby improving, for example, an edge preserving image based-denoising of CT images.

The known methods and devices do, however, not acknowledge that noise in the various images can be correlated. In particular, for DPCI there is a strong spatial correlation in transaxial images of noise within the phase contrast image (which is equivalent to the well known noise power spectrum that has peak at low frequencies), and for spectral CT there is a strong anti-correlation of noise at the same spatial location in the photo- and the Compton-image.

There may be also other situations where two images of the same object are available, but at different spatial resolution, which is also reflected by different spatial correlation in the noise. An example may be a magnetic resonance imaging (MRI), where in some situations an anatomical (e.g., T2 weighted) and a parametric image (T1) is acquired.

SUMMARY OF THE INVENTION

It is an object of the present invention to provide an improved image processing apparatus and method for filtering an image and method, in particular for joint image based denoising.

In a first aspect of the present invention an image processing apparatus for filtering an image is presented that comprises:

an image input for obtaining a first and a second image of the same object, the first and second images comprising a plurality of voxels and being interrelated by a noise covariance, each voxel having a voxel value including a signal value and a noise value, a joint bilateral filter for filtering the first image, wherein a first voxel of the first image is filtered by a filter function including a relative voxel-specific weight, said weight including a likelihood of obtaining the voxel values of said first voxel and a second voxel in the first image and of a first voxel and a second voxel in the second image, assuming that the signal value of said first voxel of the first image is identical to the signal value of a second voxel of the first image and that the signal value of a first voxel of the second image is identical to the signal value of a second voxel of the second image, an image output for providing said filtered image.

In a further aspect of the present invention a corresponding image processing method is presented.

In yet further aspects of the present invention, there are provided a computer program which comprises program code means for causing a computer to perform the steps of the processing method when said computer program is carried out on a computer as well as a non-transitory computer-readable recording medium that stores therein a computer program product, which, when executed by a processor, causes the method disclosed herein to be performed.

Preferred embodiments of the invention are defined in the dependent claims. It shall be understood that the claimed method, computer program and medium have similar and/or identical preferred embodiments as the claimed apparatus and as defined in the dependent claims.

According to the present invention an approach for improved joint-bilateral filtering is proposed. The proposed joint bilateral filter approach contains basically two terms, a distance weighting and a range weighting. This first one is purely geometrically motivated and is not changed. The range filter introduces a weighting based on the image values, which is proposed to be changed according to the present invention. In particular, the noise correlation between images and between different image locations are taken into account according to the present invention to provide for improved joint image based denoising.

In this context "interrelated" shall be understood such that the correlation can be limited to correlation between voxels of the same image or it may be limited to correlation between the same voxel positions in different images.

In a preferred embodiment said filter is configured to use a likelihood including a noise covariance matrix describing said noise covariance. By using the covariance, it becomes possible to address for instance a case where the noise is highly correlated in on direction (e.g. in-plane for DPCI) but largely uncorrelated in z-direction. In such a situation, conventional (joint-) bilateral filtering performs badly since the range filter constant can be tuned to the in-plane or the out-of-plane noise characteristic only.

Preferably, said filter is configured to use a covariance matrix of the form $$C = \begin{pmatrix} c_{11} & c_{12} & c_{13} & c_{14} \\ c_{12} & c_{22} & c_{23} & c_{24} \\ c_{13} & c_{23} & c_{33} & c_{34} \\ c_{14} & c_{24} & c_{34} & c_{44} \end{pmatrix}$$

or $$C = \begin{pmatrix} c_{11} & c_{12} & c_{13} & c_{14} \\ c_{12} & c_{11} & c_{14} & c_{13} \\ c_{13} & c_{14} & c_{33} & c_{34} \\ c_{14} & c_{13} & c_{34} & c_{33} \end{pmatrix}.$$

These covariance matrices have shown to be advantageous. The second covariance matrix is easier to handle.

The following special cases are of particular interest: For differential phase contrast imaging, there is barely any noise correlation between the imaginary (first image) and real part (second image) of the reconstructed refractive index, leading to (the nomenclature is related to the general version of C, i.e. the upper covariance matrix of the two versions shown above) $c_{13} \approx c_{23} \approx c_{14} \approx c_{24} \approx 0$, whereas there is a strong noise correlation within transaxial images in the real part of the refractive index, i.e., $c_{34} > 0$. The covariance matrix depends of course on the voxel positions, e.g., if the second voxel of the second image is in a different transaxial image, then the noise is uncorrelated, i.e., $c_{34} \approx 0$.

For spectral imaging, there is only little spatial correlation of the noise within each image (viz. the Compton and the photoelectric image), leading to $c_{12} \approx c_{34} \approx 0$, and also no correlation between different locations in different images, i.e. $c_{14} \approx c_{23} \approx 0$, but a strong negative correlation between image values in the two images at the same location, and $c_{13} < 0$, $c_{24} < 0$.

Further, in an embodiment said filter is configured to use a likelihood of the form $$p(\Delta_a, \Delta_b \mid a_1 = a_2, b_1 = b_2) \propto$$
$$F\exp\left(\frac{1}{4}(\Delta_a^2(s_{12} - s_{11}) + 2\Delta_a\Delta_b(s_{14} - s_{13}) + \Delta_b^2(s_{34} - s_{33}))\right)$$

with $$F = \frac{\sqrt{\pi(s_{11} - s_{12})}}{\sqrt{(s_{11} + s_{12})(s_{33} + s_{34}) - (s_{13} + s_{14})^2}},$$

$$S = \begin{pmatrix} s_{11} & s_{12} & s_{13} & s_{14} \\ s_{12} & s_{11} & s_{14} & s_{13} \\ s_{13} & s_{14} & s_{33} & s_{34} \\ s_{14} & s_{13} & s_{34} & s_{33} \end{pmatrix},$$

S being the inverse of the covariance matrix,
$a_1$ and $a_2$ being the first and second voxel values of the first image,
$b_1$ and $b_2$ being the first and second voxel values of the second image, and
$\Delta_a = a_1 - a_2$, $\Delta_b = b_1 - b_2$.

Still further, the filtered first voxel value of the first image is obtained as $$\tilde{a}_i = \frac{1}{N_i} \sum_{j \in N_i} a_j w_d(i, j) p(a_i - a_j, b_i - b_j \mid a_i = a_j, b_i = b_j)$$

with $$N_i = \sum_{j \in N_i} w_d(i, j) p(a_i - a_j, b_i - b_j \mid a_i = a_j, b_i = b_j)$$

and
$w_d$ is the (usual) distance weighting in standard (joint-) bilateral filtering. Any function that decreases monotonically with increasing distance $|i-j|$ may be used, for instance $$w_d(i, j) = e^{-(i-j)^2/2\sigma^2}$$

or $$w_d(i, j) = \frac{1}{(i-j)^2 + \epsilon}.$$

In practical situations, at least one of said first and second images comprises non-white noise, between said first and second images a noise correlation exists and/or the noise covariances at the first and second voxel value of the first image and/or the second image are the same.

Preferably, the same filter is applied to the second image. Further, the proposed idea can be extended in a straight forward manner to a situation with three (or more) images.

According to another embodiment the image input is configured to provide the first image and the second image such that they show different properties of the object. Preferably, the image input is configured to provide spectral computed tomography images, wherein the first image is indicative of a first physical property of the object and the second image is indicative of a second physical property of the object, the first physical property and the second physical property being different from each other.

For instance, one of the first image and the second image is a Compton image, and the other of the first image and the second image is a photoelectric image. In another embodiment one of the first image and the second image is a Compton image or a photoelectric image, and the other of the first image and the second image is a combination of a Compton image and a photoelectric image.

Still further, the image input is configured to provide differential phase contrast computed tomography images, wherein one of the first image and the second image is indicative of the absorption of the object and the other of the first image and the second image is indicative of a phase shift of radiation, which traverses the object, induced by the object.

BRIEF DESCRIPTION OF THE DRAWINGS

These and other aspects of the invention will be apparent from and elucidated with reference to the embodiment(s) described hereinafter. In the following drawings

DETAILED DESCRIPTION OF THE INVENTION

Figure 1:
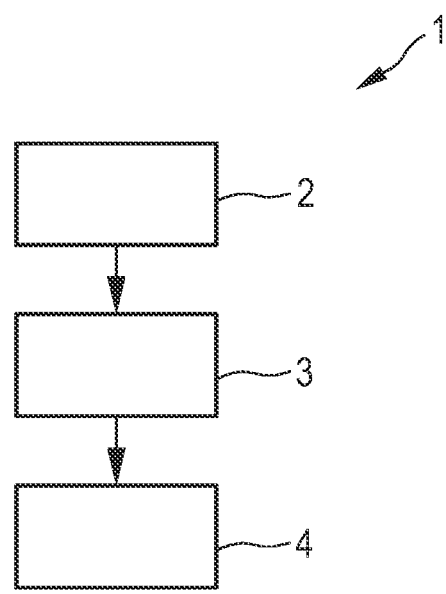
FIG. 1 shows schematically and exemplarily an embodiment of an image processing apparatus according to the present invention.

FIG. 1 shows schematically an embodiment of an image processing apparatus 1 according to the present invention. It comprise an image input 2 for obtaining a first and a second image of the same object, the first and second images comprising a plurality of voxels and being interrelated by a noise covariance, each voxel having a voxel value including a signal value and a noise value. The apparatus 1 further comprises a bilateral filter 3 for filtering the first image, wherein a first voxel of the first image is filtered by a filter function including a relative voxel-specific weight. Said weight includes a likelihood of obtaining the voxel values of said first voxel and a second voxel in the second image and of a first voxel and a second voxel in the second image, assuming that the signal value of said first voxel of the first image is identical to the signal value of a first voxel of the second image and that the signal value of a second voxel of the first image is identical to the signal value of a second voxel of the second image. The apparatus 1 further comprises an image output 4 for providing said filtered image, which may e.g. be a display for displaying the filtered image.

The first image and the second image can be two-, three- or four-dimensional images showing the same object which can be a whole object or only a part of an object, for example, only a slice of an object. If the object is a moving object like the heart of a person the first image and the second image show the object preferentially in the same moving state. This embodiment, the first image and the second image are reconstructed based on projection data, in particular, based on computed tomography projection data, wherein the first image and the second image are reconstructed from the same projection data.

The image input unit 2 is adapted to provide the first image and the second image such that they show different properties, in particular, different physical properties, of the object. In an embodiment, the image input unit 2 is adapted to provide spectral computed tomography images, wherein the first image is indicative of a first physical property of the object and the second image is indicative of a second physical property of the object, wherein the first physical property and the second physical property are different from each other. For example, one of the first image and the second image can be a Compton image and the other of the first image and the second image can be a photoelectric image, or one of the first image and the second image can be a Compton image or a photoelectric image, and the other of the first image and the second image can be a combination of a Compton image and a photoelectric image.

Figure 2:
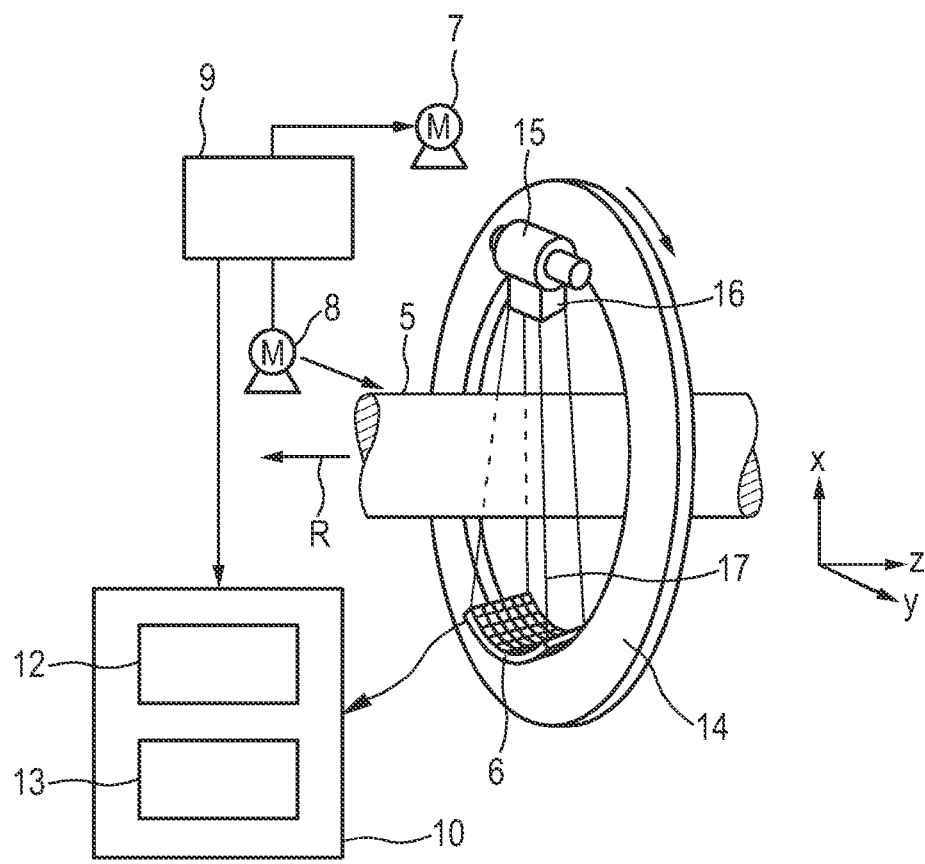
FIG. 2 shows schematically and exemplarily an embodiment of an image input unit.

The image input unit 2 can be a storing unit, in which the first image and the second image are stored, or the image input unit 2 can also be an image receiving unit allowing to receive the first image and/or the second image via a data connection. The image input unit 2 can also be an imaging modality like a spectral computed tomography system which generates the first image and the second image. Such a spectral computed tomography system will in the following schematically and exemplarily be described with reference to FIG. 2.

The spectral computed tomography system includes a gantry 14 which is capable of rotating around an axis of rotation R, which extends parallel to the z direction. A radiation source 15, for example an X-ray tube, is mounted on the gantry 14. In this embodiment, the radiation source 15 emits polychromatic radiation. The radiation source 15 is provided with a collimator device 16 which forms a conical radiation beam 17 from the radiation emitted by the radiation source 15. In other embodiments, the collimator device 16 can be adapted for forming a radiation beam having another shape, for example, having a fan shape.

The radiation traverses an object (not shown in FIG. 2), such as a patient or a technical object, in a region of interest in a cylindrical examination zone 5. After having traversed the region of interest, the radiation beam 17 is incident on a detection device 6 having in this embodiment a two-dimensional detection surface, wherein the detection device 6 is mounted on the gantry 14. In another embodiment, the detection device 6 can comprise a one-dimensional detection surface.

The detection device 6 comprises preferentially energy-resolving detector elements. The energy-resolving detector elements are preferentially photon-counting detector elements which work, for example, on the principle of counting the incident photons and output a signal that shows the number of photons in different energy windows. Such an energy-resolving detection device is, for instance, described in Llopart X., et al., "First test measurements of a 64 k pixel readout chip working in a single photon counting mode", Nucl. Inst. and Meth. A, 509 (1-3): 157-163, 2003 and in Llopart, X., et al., "Medipix2: A 64-k pixel readout chip with 55 µm square elements working in a single photon counting mode", IEEE Trans. Nucl. Sci. 49(5): 2279-2283, 2002. Preferably, the energy-resolving detector elements are adapted such that each detector element provides at least two energy-resolved detection signals for at least two different energy windows. However, it is favorable to have an even higher energy resolution in order to enhance the sensitivity and noise robustness of the imaging system.

The gantry 14 is driven at a preferably constant but adjustable angular speed by a motor 7. A further motor 8 is provided for displacing the object, for example, a patient who is arranged on a patient table in the examination zone 5, parallel to the direction of the axis of rotation or the z axis. These motors 7, 8 are controlled by a control unit 9, for instance, such that the radiation source 15 and the examination zone 5, in particular, the region of interest, move relative to each other along a helical trajectory. It is also possible, that the object or the examination zone 5, in particular the region of interest, is not moved and that the radiation source 15 is rotated, i.e. that the radiation source 15 travels along a circular trajectory relative to the region of interest. The data acquired by the detection device 6 are, in this embodiment, energy-dependent detection data which are provided to a reconstruction unit 10 for reconstructing at least the first and second image of the region of interest from the provided energy-dependent detection data. Also the reconstruction unit 10 is preferentially controlled by the control unit 9. The reconstructed images are provided to the filtering unit 3 for filtering at least the first image.

The reconstruction unit 10 comprises a calculation unit 12 for determining at least two attenuation components from the detection data. An attenuation component of the detection data is caused by only one or by several physical effects, for example, one attenuation component can be a component caused by the Compton effect and another attenuation component can be a component caused by the photoelectric effect. A further attenuation component can be a component caused by a k-edge present in the region of interest. Alternatively or in addition, an attenuation component can be a component caused by, for example, an absorption of a certain material within the region of interest. For example, an attenuation component can be a component caused by the absorption of a certain material and another attenuation component can be a component caused by the absorption of another material.

The reconstruction unit 10 further comprises a backprojection unit 13 for backprojecting the calculated attenuation components of the detection data such that corresponding attenuation component images are reconstructed. For example, a Compton image can be reconstructed as one of the first image and the second image and a photoelectric image can be reconstructed as the other of the first image and the second image.

Figure 3:
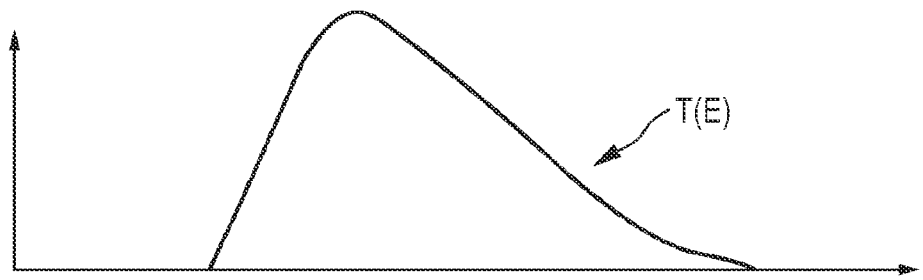
FIG. 3 shows schematically and exemplarily an emission spectrum of a polychromatic radiation source.

The input to the calculation unit 12 are energy-resolved detection data $d_i$ of a plurality, in this embodiment at minimum three, energy bins. These detection data $d_i$ show a spectral sensitivity $D_i(E)$ of the i-th energy bin $e_i$. Furthermore, the emission spectrum $T(E)$ of the polychromatic radiation source 15 is generally known or can be measured. An example of such an emission spectrum $T(E)$ of a polychromatic radiation source is schematically and exemplarily shown in FIG. 3. In the calculation unit 12 the generation of the detection data $d_i$ is modeled as a linear combination of the photoelectric effect with spectrum $P(E)$, the Compton effect with spectrum $B(E)$ and a k-edge with spectrum $K(E)$.

Figure 4:
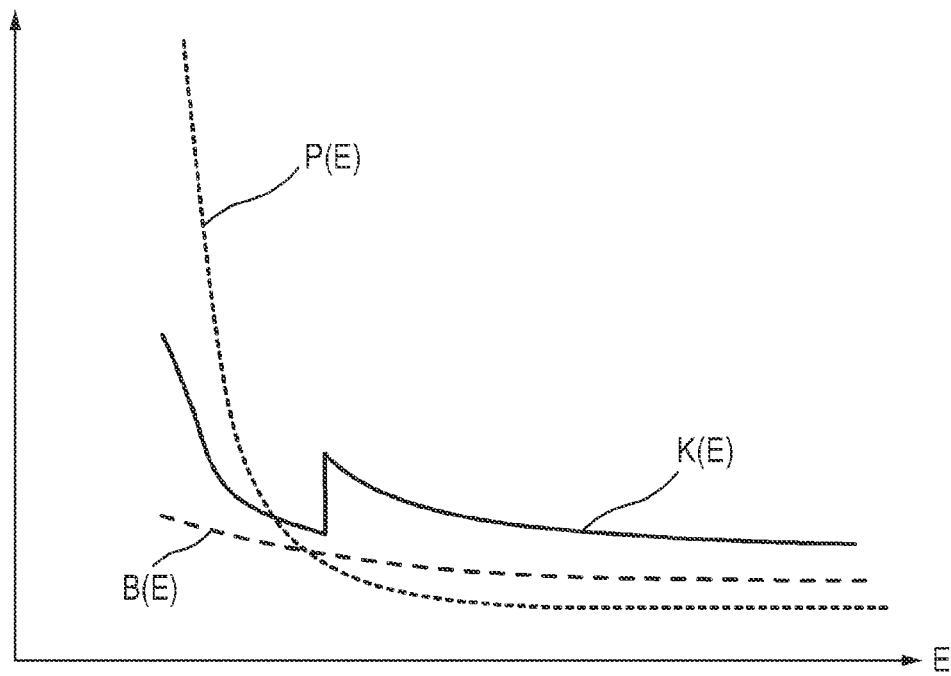
FIG. 4 shows schematically and exemplarily the energy dependence of the cross-section of the photoelectric effect, the Compton effect and the total attenuation of a material with a k-edge within the displayed energy range.

Spectra $P(E)$, $B(E)$ and $K(E)$ are exemplarily and schematically shown in FIG. 4.

The generation of the detection data can be modeled by following system of equations:

$$d_i = \int dE T(E) D_i(E) \exp[-(\rho_{photo} P(E) + \rho_{Compton} B(E) + \rho_{k-edge} K(E))], \quad (1)$$

wherein $\rho_{photo}$, $\rho_{Compton}$ and $\rho_{k-edge}$ are the density length products of the photoelectric component, the Compton component and the k-edge component, respectively.

Since at least three detection signals $d_1, d_2, d_3$ are available for the at least three energy bins $e_1, e_2, e_3$, a system of at least three equations is formed having three unknowns, which are the three density length products, which can thus be solved with known numerical methods in the calculation unit 12. If more than three energy bins are available, it is preferred to use a maximum likelihood approach that takes the noise statistics of the measurements into account. Generally, three energy bins are sufficient. In order to increase the sensitivity and noise robustness, however, it is preferred to have more detection data for more energy bins. For each attenuation component, i.e. for each density length product, an attenuation component image of the object can be reconstructed by backprojecting the respective density length product. Alternatively or in addition, images of different density length products or, before backprojecting, different density length products can be combined for generating a combination image being an image of the object generated by the combined attenuation components.

In another embodiment, the image input unit 2 can be adapted to provide differential phase contrast computed tomography images, wherein one of the first image and the second image is indicative of the absorption of the object and the other of the first image and the second image is indicative of a phase shift of radiation, which traverses the object, induced by the object. In particular, the first image shows preferentially the total attenuation coefficient of the object and the second image shows preferentially the real part of the refractive index of the object. Also these first and second images can be stored in a storing unit which may be the image input unit 2 or can be received via an image receiving unit which may also be the image input unit 2. However, the image input unit 2 can also be a differential phase contrast computed tomography system, which generates the first image and the second image and which will exemplarily and schematically be described in the following with reference to FIG. 5.

Figure 5:
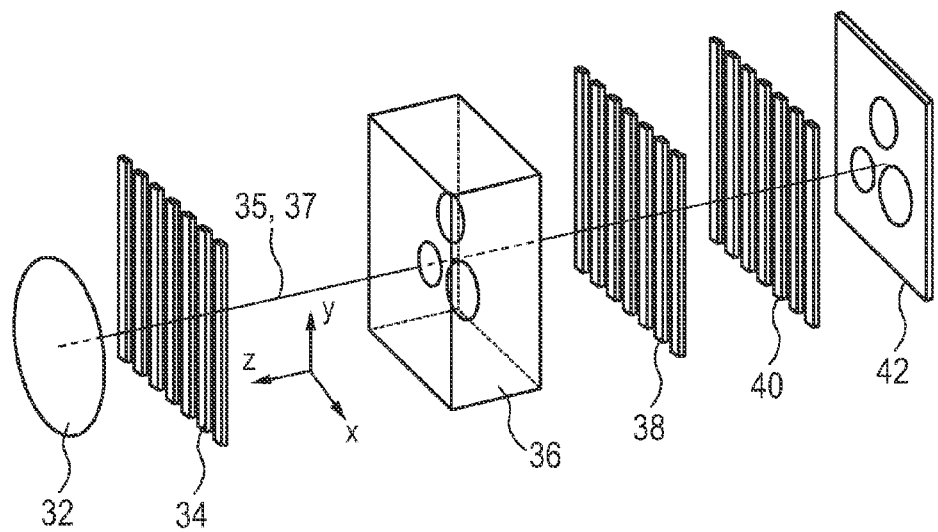
FIG. 5 shows schematically and exemplarily elements of an embodiment of a differential phase contrast computed tomography system.
Figure 6:
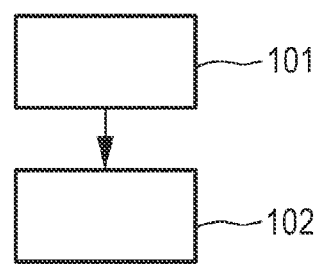
FIG. 6 shows exemplarily a flowchart illustrating an embodiment of an image processing method for processing an image.

FIG. 5 shows a three-dimensional representation of an exemplary embodiment of a differential phase contrast computed tomography system. A rather large X-ray source 32 is arranged adjacent to a source grating 34. Since the X-ray source 32 may be considered to be incoherent due to its size with respect to the wavelength of the radiation emitted, a source grating 34 is employed for providing a plurality of single coherent X-ray sources.

X-radiation 35 emanates from X-ray source 32 in the direction of the optical axis 37 possibly constituting a fan-beam or cone-beam of X-rays. The respective shape of the X-ray beam is not depicted in FIG. 5. X-radiation 35 arrives at object 36, penetrates object 36, and subsequently arrives at a beam splitter grating 38. The trenches or gaps of the beam splitter grating 38 alter the phase of passing electromagnetic radiation with respect to the solid areas of the beam splitter grating, the blocking region. Accordingly, a phase shift by $\phi$, in particular by $\pi$, is performed.

An analyzer grating 40 is arranged between the beam splitter grating 38 and an X-ray detector 42. The multiple waves originating from the beam splitter grating 38 in the direction of the X-ray detector arrive at the analyzer grating 40, and subsequently produce an intensity modulation pattern on the surface of the X-ray detector 42.

By shifting the beam splitter grating 38 versus the analyzer grating 40, thus displacing of gratings relative to one another, in particular with a fraction of the grating periods of the beam splitter grating 38 or the analyzer grating 40, a plurality of transmission images are obtainable by the image detector 42. Thus, during the acquisition of the transmission images, a so-called phase stepping is performed, where the relative position of the gratings 38, 40 is varied, for example, in four to ten steps, over one period and a transmission image is measured for each relative position. From this series of transmission images, the conventional absorption image is obtained by simple averaging the measured intensity for each detector pixel. As in conventional x-ray transmission imaging, this measurement is related to the line integral over the total attenuation coefficient along the x-ray path by Beer's law. Information about the real part of the refractive index is obtained by analysis of the dynamics of the measured intensity over the phase stepping cycle. The intensity varies preferentially periodically with the grating period of the analyzer grating 40. Typically, a sinusoidal variation can be assumed. The phase of the sinus is related to the gradient of the phase front hitting the beam splitter grating 38. By physics, this gradient of the phase front is linearly related to the first derivative of the projection of the real part of the refractive index of the object. Thus, the projection of the real part of the refractive index of the object can be determined based on the phase of the sinus. By backprojecting the determined projection of the real part of the refractive index of the object, an image showing the real part of the refractive index of the object can be reconstructed. The differential phase contrast computed tomography system can therefore reconstruct, for example, a first image showing the total attenuation coefficient of the object and a second image showing the real part of the refractive index of the object. A more detailed description of the known differential phase contrast computed tomography technique is disclosed in, for example, the article "X-ray phase imaging with a grating interferometer", by Timm Weitkamp et al., OPTICS EXPRESS, vol. 13, no. 16, pages 6296-6304 (August 2005), which is herewith incorporated by reference.

In WO 2011/145040 A1 joint bilateral filtering has been proposed as a generalization of the well-known bilateral filter for image based de-noising. In this approach the filtering unit is preferentially adapted to perform the filtering such that the first image is denoised by using following filtering equation:

$$\hat{u}^{(1)}(\vec{x}_i) = \frac{\sum_{\vec{x}_j \in \Delta_i} L_1(\vec{u}^{(1)}(\vec{x}_i) - \vec{u}^{(1)}(\vec{x}_j)) L_2(\vec{u}^{(2)}(\vec{x}_i) - \vec{u}^{(2)}(\vec{x}_j)) w_d(\vec{x}_i - \vec{x}_j) u^{(1)}(\vec{x}_j)}{\sum_{\vec{x}_j \in \Delta_i} L_1(\vec{u}^{(1)}(\vec{x}_i) - \vec{u}^{(1)}(\vec{x}_j)) L_2(\vec{u}^{(2)}(\vec{x}_i) - \vec{u}^{(2)}(\vec{x}_j)) w_d(\vec{x}_i - \vec{x}_j)}, \quad (2)$$

wherein $\hat{u}^{(1)}(\vec{x}_i)$ denotes an average image value for a first image element at a position $\vec{x}_i$ of the first image, $\Delta_i$ denotes a first region which comprises the first image element at the position $\vec{x}_i$, $\vec{x}_j$ denotes positions of first region image elements within the first region $\Delta_i$, $L_1(\vec{u}^{(1)}(\vec{x}_i) - \vec{u}^{(1)}(\vec{x}_j))$ denotes the first degree of similarity between a) the image value of the first region image element $\vec{x}_j$ and optionally image values of image elements surrounding the respective first region element at the position $\vec{x}_j$ and b) the image value of the first image element at the position $\vec{x}_i$ an optionally image values of image elements surrounding the first image element of the first image.

The function $L_2(\vec{u}^{(2)}(\vec{x}_i) - \vec{u}^{(2)}(\vec{x}_j))$ denotes a second degree of similarity between a) the image value of the second region image element at the position $\vec{x}_j$ within a second region, which corresponds to the first region, of the second image and optionally image values of image elements surrounding the second region element at the position $\vec{x}_j$, and b) the image value of a second image element at the position $\vec{x}_i$, which corresponds to the first image element at the same position in the first image, of the second image and optionally image values of image elements surrounding the second image element. The function $w_d(\vec{x}_i - \vec{x}_j)$ is a distance function which depends on distances between the image elements at the positions $\vec{x}_i$ and $\vec{x}_j$ and $\vec{u}^{(1)}(\vec{x}_j)$ denotes the unfiltered image value at the position $\vec{x}_j$ in the first image.

The combination of the first degree of similarity $L_1$, the second degree of similarity $L_2$ and the distance function $w_d$ divided by the denominator shown in equation (2) can be regarded as a weight for performing the weighted averaging in accordance with equation (2). Thus, in accordance with equation (2), the filtering unit 3 is preferentially adapted to weightedly average image values of image elements of the first image, wherein for determining an average image value for a first image element of the first image, image values of first region image elements within a first region, which comprises the first image element, are weighted and averaged, wherein the image values of the first region image elements are weighted with weights depending on the first degree of similarity being a degree of similarity between a) the image values of the first region image elements and optionally image values of image elements surrounding the respective first image element and b) the image value of the first image element and image values of image elements surrounding the first image element of the first image, and depending on the second degree of similarity being a degree of similarity between a) image values of second region image elements within a second region, which corresponds to the first region of the second image and optionally image values of image elements surrounding the respective second region image element, and b) the image value of a second image element, which corresponds to the first image element, of the second image and optionally image values of image elements surrounding the second image element.

The vector $\vec{u}(\vec{x}_{i,j})$ can be regarded as an image patch centered around $\vec{x}_{i,j}$. For instance, if the optional image values of image elements surrounding the respective first image element and the optional image values of image elements surrounding the respective second image element are considered, in a two-dimensional case, the image patch may be a 9×9 sub-image centered around the pixel at the position $\vec{x}_{i,j}$. The patch can also have another size. For example, the patch can have a 5×5 or 7×7 size. Moreover, also a three-dimensional patch can be used. If the optional image values are not considered, i.e. if only differences between single image values at the positions $\vec{x}_i$ and $\vec{x}_j$ are considered, the respective vector comprises only the respective single image value at the position $\vec{x}_i$ or $\vec{x}_j$, respectively. The patch size is then 1×1.

If the filtering is performed based on more than two images, the filtering unit 3 is preferentially adapted to filter the first image in accordance with following filtering equation:

$$\hat{u}^{(1)}(\vec{x}_i) = \frac{\sum_{\vec{x}_j \in \Delta_i} \prod_{k=1...N} L_k(\vec{u}^{(k)}(\vec{x}_i) - \vec{u}^{(k)}(\vec{x}_j)) K(\vec{x}_i - \vec{x}_j) u^{(1)}(\vec{x}_j)}{\sum_{\vec{x}_j \in \Delta_i} \prod_{k=1...N} L_k(\vec{u}^{(k)}(\vec{x}_i) - \vec{u}^{(k)}(\vec{x}_j)) K(\vec{x}_i - \vec{x}_j)}, \quad (3)$$

wherein N denotes the number of images considered for filtering the first image and the index k indicates that the respective element belongs to the k-th image.

The k-th degree of similarity can be defined by following equation:

$$L_k(\vec{u}^{(k)}(\vec{x}_i) - \vec{u}^{(k)}(\vec{x}_j)) = e^{-\|\vec{u}^{(k)}(\vec{x}_i) - \vec{u}^{(k)}(\vec{x}_j)\|^2 / 2\sigma_L^{(k)}(\vec{x}_i) \sigma_L^{(k)}(\vec{x}_j)}, \quad (4)$$

wherein $\sigma_L^{(k)}(\vec{x}_i)$ and $\sigma_L^{(k)}(\vec{x}_j)$ denote local noise estimates at the position $\vec{x}_i$ and $\vec{x}_j$, respectively.

Noise estimates can be obtained either manually by determination of the standard deviation within a region that is considered to be in reality a homogeneous region. It is also possible to obtain spatially resolved noise estimates by classical noise propagation starting from the noise in the initial raw data which is known at least to a good approximation. The known classical noise propagation is disclosed in, for example, the article "Image covariance and lesion detectability in direct fan-beam x-ray computed tomography" by Adam Wunderlich et al., Institute of Physics and Engineering in Medicine, pages 2471 to 2493 (2008), which is herewith incorporated by reference. The same concept can be applied to differential phase contrast computed tomography as well as spectral computed tomography.

Instead of local noise estimates also a global noise estimate can be used, in particular, if the noise is not largely varying across the images.

The above mentioned equations ensure that the weight of an image value of a first region image element decreases, if one of a) the first degree of similarity between the first region image element and the first image element and b) the second degree of similarity between the second region image element and the second image element decreases and if the other of a) the first degree of similarity between the first region image element and the first image element and b) the second degree of similarity between the second region image element and the second image element remains unchanged or decreases.

The degrees of similarity provide an estimate how likely the two image values or the two image patches are the same, in particular, if the respective image would be denoised. The degree of similarity defined in equation (4) can therefore also be regarded as a kind of probability that image values are similar. For differences much smaller than the noise, the likelihood or probability is close to one, and the degree of similarity falls to zero for differences larger than the noise level. In particular, if image patches having a size larger than 1×1 are considered, because of the Gaussian prototype of the degree of similarity the resulting weight of an image value at the position $\vec{x}_j$ will be small, if the image patches around $\vec{x}_i$ and $\vec{x}_j$ are statistically different in either of the N images. It can therefore be ensured that no smoothing across statistically significant edges in the first image is performed. The filtering is therefore edge preserving.

The distance function, which can also be regarded as a spatial weighting function, can be defined by following equation:

$$w_d(\vec{x}_i - \vec{x}_j) = e^{-|\vec{x}_i - \vec{x}_j|/2\sigma_{w_d}^2}, \quad (5)$$

or $$w_d(\vec{x}_i - \vec{x}_j) = \begin{cases} 1 & \text{for } |\vec{x}_i - \vec{x}_j| < \sigma_{w_d} \\ 0 & \text{else} \end{cases}, \quad (6)$$

wherein the parameter $\sigma_{w_d}$ controls the effective size of the neighborhood taken into account during averaging.

In the following a further improved approach for joint bilateral filtering as proposed herein is outlined. The bilateral filtering approach contains basically two terms, a distance weighting (referred to as "$w_d$" in the above equations (5) and (6)) and a range weighting (referred to as "L" in the above equation (4)). The distance weighting is purely geometrically motivated and is not changed compared to the above described known approach. The range filter introduces a weighting based on the image values, which is proposed to be changed according to the present invention compared to the above described known approach.

An example shall now be explained for two images. The basic task for bilateral filtering is to estimate a probability for two different pixels to belong to the same tissue class, i.e., the likelihood that the underlying true pixel values are the same. This estimation is based on the evaluation of four (or more) image samples, which are samples at the same two different locations in the two images. These samples are denoted as $a_1$, $a_2$, $b_1$, $b_2$ ($a_i$ and $b_i$ corresponding to $u^{(1)}(\vec{x}_i)$ and $u^{(2)}(\vec{x}_i)$ mentioned above and these are used in the following in order to achieve a more compact notation) and they form a vector $(a_1, a_2, b_1, b_2)$. Second order statistics on these samples describes the noise in these measurements by the (newly introduced) covariance matrix C $$C = \begin{pmatrix} c_{11} & c_{12} & c_{13} & c_{14} \\ c_{12} & c_{22} & c_{23} & c_{24} \\ c_{13} & c_{23} & c_{33} & c_{34} \\ c_{14} & c_{24} & c_{34} & c_{44} \end{pmatrix} \quad (7)$$

where the diagonal elements describe the noise variances of the samples and the off-diagonal elements the correlation of noise within the images ($c_{12}$, $c_{34}$) or between the images ($c_{13}$, $c_{14}$, $c_{23}$, $c_{24}$). The matrix C is symmetric and positive definite. With this covariance matrix, we can write the likelihood of obtaining the noise realizations ($n_1$, $n_2$, $n_3$, $n_4$) in the measured vector ($a_1$, $a_2$, $b_1$, $b_2$):

$$p(n_1, n_2, n_3, n_4) \propto \exp(\tfrac{1}{2}(n_1, n_2, n_3, n_4) C^{-1} (n_1, n_2, n_3, n_4)^T) \quad (8)$$

It is not possible to distinguish between noise and signal content in the measurement. Therefore, it is examined how likely is it to observe the actual measurement ($a_1$, $a_2$, $b_1$, $b_2$) under the assumption $a_1 = a_2$ and $b_1 = b_2$. This can be answered easily for the given statistics, since under this assumption, the signal content in the measurement can be eliminated by calculating the differences $\Delta_a = a_1 - a_2$, $\Delta_b = b_1 - b_2$ and integrating over all combinations of ($n_1$, $n_2$, $n_3$, $n_4$) which yield these differences. For compactness of notation, it is set $S = C^{-1}$. The desired likelihood can be calculated according to $$p(\Delta_a, \Delta_b | a_1 = a_2, b_1 = b_2) \propto \int_{-\infty}^{\infty} \int_{-\infty}^{\infty} \exp\left(\frac{1}{2}(n_1, \Delta_a - n_1, n_3, \Delta_b - n_3)\right. \quad (9)$$

$$\left. S(n_1, \Delta_a - n_1, n_3, \Delta_b - n_3)^T \right) dn_1 \, dn_3$$

This marginal likelihood needs to be inserted as the joint likelihood term in the joint bilateral filter equation resulting in $$\bar{a}_i = \frac{1}{N_i} \sum_{j \in N_i} a_j w_d(i, j) p(a_i - a_j, b_i - b_j \mid a_i = a_j, b_i = b_j) \quad (10)$$

For the most general covariance matrix, the explicit calculation of the integrals becomes quite complicated. However, once the covariance matrix C is known numerically, it is an easy task to calculate the inverse matrix S and the likelihood for the actual measurements.

Two simple cases shall be considered: If the noise of the four samples in uncorrelated, then both the covariance matrix and its inverse are diagonal and the desired likelihood is just a product of Gaussian functions. Another interesting case is for a covariance matrix of the form $$C = \begin{pmatrix} c_{11} & c_{12} & c_{13} & c_{14} \\ c_{12} & c_{11} & c_{14} & c_{13} \\ c_{13} & c_{14} & c_{33} & c_{34} \\ c_{14} & c_{13} & c_{34} & c_{33} \end{pmatrix} \quad (11)$$

Geometrically, this covariance matrix models the case where the image variances at the two image locations are the same (i.e., $c_{11}=c_{22}$, $c_{33}=c_{44}$) and that the covariance between the images is symmetric with respect to the two image locations ($c_{13}=c_{24}$, $c_{14}=c_{23}$). In typical situations, these relations are fulfilled approximately since the variances in reconstructed CT images vary only slowly in space.

This increased symmetry is also reflected in the inverse matrix S, which reads $$S = \frac{1}{N}\begin{pmatrix} c_{34}H_6 + c_{11}H_2 - c_{33}H_3 & c_{33}H_6 - c_{12}H_2 - c_{34}H_3 & c_{13}(c_{13}^2 - H_5) + c_{14}H_1 & c_{14}(c_{14}^2 - H_5) + c_{13}H_1 \\ c_{33}H_6 - c_{12}H_2 - c_{34}H_3 & c_{34}H_6 + c_{11}H_2 - c_{33}H_3 & c_{14}(c_{14}^2 - H_5) + c_{13}H_1 & c_{13}(c_{13}^2 - H_5) + c_{14}H_1 \\ c_{13}(c_{13}^2 - H_5) + c_{14}H_1 & c_{14}(c_{14}^2 - H_5) + c_{13}H_1 & c_{12}H_6 + c_{33}H_4 - c_{11}H_3 & c_{11}H_6 - c_{34}H_4 - c_{12}H_3 \\ c_{14}(c_{14}^2 - H_5) + c_{13}H_1 & c_{13}(c_{13}^2 - H_5) + c_{14}H_1 & c_{11}H_6 - c_{34}H_4 - c_{12}H_3 & c_{12}H_6 + c_{33}H_4 - c_{11}H_3 \end{pmatrix} \quad (12)$$

with $N = \det(C)$,
$H_1 = c_{12}c_{33} + c_{11}c_{34} - c_{14}c_{13}$,
$H_2 = c_{33}^2 - c_{34}^2$,
$H_3 = c_{14}^2 - +c_{13}^2$,
$H_4 = c_{11}^2 - c_{12}^2$,
$H_5 = c_{11}c_{33} + c_{12}c_{34}$,
$H_6 = 2c_{13}c_{14}$ Apparently, the symmetry of the covariance matrix is also present in its inverse, which can therefore be written as $$S = \begin{pmatrix} s_{11} & s_{12} & s_{13} & s_{14} \\ s_{12} & s_{11} & s_{14} & s_{13} \\ s_{13} & s_{14} & s_{33} & s_{34} \\ s_{14} & s_{13} & s_{31} & s_{33} \end{pmatrix} \quad (13)$$

Under this assumption, the desired likelihood for measuring the vector $(a_1, a_2, b_1, b_2)$ is:

$$p(\Delta_a, \Delta_b \mid a_1 = a_2, b_1 = b_2) \propto \quad (14)$$
$$F\exp\left(\frac{1}{4}(\Delta_a^2(s_{12} - s_{11}) + 2\Delta_a\Delta_b(s_{14} - s_{13}) + \Delta_b^2(s_{34} - s_{33}))\right)$$

with $$F = \frac{\sqrt{\pi(s_{11} + s_{12})}}{\sqrt{(s_{11} + s_{12})(s_{33} + s_{34}) - (s_{13} + s_{14})^2}} \quad (15)$$

It shall be noted that the joint likelihood as given in Eq. (14) as inserted in the filter Eq. (16) does not have the form of a product of independent degrees of similarity derived on the two images as done in prior art, but there is an additional term, namely the product of differences $\Delta_a\Delta_b$.

In conclusion, the proposed filter on two images a and b can be written as $$\tilde{a}_i = \frac{1}{N_i}\sum_{j \in N_i} a_j w_d(i,j) p(a_i - a_j, b_i - b_j \mid a_i = a_j, b_i = b_j) \quad (16)$$

with $$N_i = \sum_{j \in N_i} w_d(i,j) p(a_i - a_j, b_i - b_j \mid a_i = a_j, b_i = b_j) \quad (17)$$

being a voxel specific normalization factor, p is the likelihood of equation (14), $w_d(i, j)$ is the usual distance weighting (referred to as $w_d(\vec{x}_i - \vec{x}_j)$ in equations (5) and (6)) in the bilateral filter. The two sums run over all voxels in a neighborhood of the voxel i. The second image b is filtered accordingly.

In summary, known bilateral filtering of an image a uses voxel-specific weights for local averaging:

$$\tilde{a}_i = \frac{1}{N_i}\sum_{j \in N_i} a_j w_d(i,j) e^{-(a_i - a_j)^2 / 2\sigma_a^2} \quad (18)$$

$$N_i = \sum_{j \in N_i} w_d(i,j) e^{-(a_i - a_j)^2 / 2\sigma_a^2}$$

with $w_d$ being the distance dependent weighting (e.g. Gaussian), $\sigma$ being the (local) noise level in the image a.

Known joint bilateral filtering of an image a uses voxel-specific weights for local averaging:

$$\tilde{a}_i = \frac{1}{N_i}\sum_{j \in N_i} a_j w(i,j) e^{-(a_i - a_j)^2 / 2\sigma_a^2} e^{-(b_i - b_j)^2 / 2\sigma_b^2}$$

$$N_i = \sum_{j \in N_i} w(i,j) e^{-(a_i - a_j)^2 / 2\sigma_a^2} e^{-(b_i - b_j)^2 / 2\sigma_b^2}$$

where deliberately a simple Gaussian similarity measure is used with noise levels $\sigma_a$ and $\sigma_b$ as similarity measures $L_1$ and $L_2$ as mentioned already in Eq. (4) to show clearly the difference to the current invention.

In contrast, the proposed bilateral filtering of an image a uses information about edges from all images and full second order noise information to obtain $$\tilde{a}_i = \frac{1}{N_i}\sum_{j \in N_i} a_j w_d(i,j) p(a_i - a_j, b_i - b_j \mid a_i = a_j, b_i = b_j)$$

-continued $$N_i = \sum_{j \in N_i} w_d(i, j) p(a_i - a_j, b_i - b_j | a_i = a_j, b_i = b_j)$$

$$p(a_i - a_j, b_i - b_j | a_i = a_j, b_i = b_j) \propto$$

$$\int_{-\infty}^{\infty} \int_{-\infty}^{\infty} \exp\left(\frac{1}{2}(n_1, \Delta_a - n_1, n_3, \Delta_b - n_3) S_{ij}(n_1, \Delta_a - n_1, n_3, \Delta_b - n_3)^T\right) dn_1 dn_3$$

with $\Delta_a$ and $\Delta_b$ being short forms of $a_i-a_j$ and $b_i-b_j$, respectively, and $S_{ij}$ being the inverse of the noise covariance matrix for the image samples ($a_i, a_j, b_i, b_j$).

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable non-transitory medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. An image processing apparatus for filtering an image, said apparatus comprising
   an image input for obtaining a first and a second image of the same object, the first and second images comprising a plurality of voxels and being interrelated by a noise covariance, each voxel having a voxel value including a signal value and a noise value,
   a joint bilateral filter for filtering the first image, wherein a first voxel of the first image is filtered by a filter function including a relative voxel-specific weight, said weight including a likelihood of obtaining the voxel values of said first voxel and a second voxel in the first image and of a first voxel and a second voxel in the second image, assuming that the signal value of said first voxel of the first image is identical to the signal value of a second voxel of the first image and that the signal value of the first voxel of the second image is identical to the signal value of a second voxel of the second image, wherein said filter is configured to use a likelihood including a noise covariance matrix describing said noise covariance,
   an image output for providing said filtered image.

2. The image processing apparatus as claimed in claim 1, wherein said filter is configured to use a covariance matrix of the form $$C = \begin{pmatrix} c_{11} & c_{12} & c_{13} & c_{14} \\ c_{12} & c_{22} & c_{23} & c_{24} \\ c_{13} & c_{23} & c_{33} & c_{34} \\ c_{14} & c_{24} & c_{34} & c_{44} \end{pmatrix}$$

or $$C = \begin{pmatrix} c_{11} & c_{12} & c_{13} & c_{14} \\ c_{12} & c_{11} & c_{14} & c_{13} \\ c_{13} & c_{14} & c_{33} & c_{34} \\ c_{14} & c_{13} & c_{34} & c_{33} \end{pmatrix}.$$

3. The image processing apparatus as claimed in claim 1, wherein said filter is configured to use a likelihood of the form $$p(a_i - a_j, b_i - b_j | a_i = a_j, b_i = b_j) \propto$$

$$\int_{-\infty}^{\infty} \int_{-\infty}^{\infty} \exp\left(\frac{1}{2}(n_1, \Delta_a - n_1, n_3, \Delta_b - n_3) S_{ij}(n_1, \Delta_a - n_1, n_3, \Delta_b - n_3)^T\right) dn_1 dn_3$$

S being the inverse of the covariance matrix,
$a_1$ and $a_2$ being the first and second voxel values of the first image,
$b_1$ and $b_2$ being the first and second voxel values of the second image, and
$\Delta_a = a_1 - a_2$, $\Delta_b = b_1 - b_2$.

4. The image processing apparatus as claimed in claim 1, wherein said filter is configured to use a likelihood of the form $$p(\Delta_a, \Delta_b | a_1 = a_2, b_1 = b_2) \propto$$

$$F \exp\left(\frac{1}{4}(\Delta_a^2(s_{12} - s_{11}) + 2\Delta_a \Delta_b(s_{14} - s_{13}) + \Delta_b^2(s_{34} - s_{33}))\right)$$

with $$F = \frac{\sqrt{\pi(s_{11} + s_{12})}}{\sqrt{(s_{11} + s_{12})(s_{33} + s_{34}) - (s_{13} + s_{14})^2}},$$

$$S = \begin{pmatrix} s_{11} & s_{12} & s_{13} & s_{14} \\ s_{12} & s_{11} & s_{14} & s_{13} \\ s_{13} & s_{14} & s_{33} & s_{34} \\ s_{14} & s_{13} & s_{34} & s_{33} \end{pmatrix},$$

S being the inverse of the covariance matrix,
$a_1$ and $a_2$ being the first and second voxel values of the first image,
$b_1$ and $b_2$ being the first and second voxel values of the second image, and
$\Delta_a = a_1 - a_2$, $\Delta_b = b_1 - b_2$.

5. The image processing apparatus as claimed in claim 1, wherein the filtered first voxel value of the first image is obtained as $$\bar{a}_i = \frac{1}{N_i} \sum_{j \in N_i} a_j w_d(i, j) p(a_i - a_j, b_i - b_j | a_i = a_j, b_i = b_j)$$

with

-continued $$N_i = \sum_{j \in N_i} w_d(i,j) p(a_i - a_j, b_i - b_j | a_i = a_j, b_i = b_j)$$

and
$w_d$ is the distance weighting in bilateral filtering.

6. The image processing apparatus as claimed in claim 1, wherein the image input is configured to provide the first image and the second image such that they show different properties of the object.

7. The image processing apparatus as claimed in claim 6, wherein the image input is configured to provide spectral computed tomography images, wherein the first image is indicative of a first physical property of the object and the second image is indicative of a second physical property of the object, the first physical property and the second physical property being different from each other.

8. The image processing apparatus as claimed in claim 6, wherein one of the first image and the second image is a Compton image, and the other of the first image and the second image is a photoelectric image.

9. The image processing apparatus as defined in claim 6, wherein one of the first image and the second image is a Compton image or a photoelectric image, and the other of the first image and the second image is a combination of a Compton image and a photoelectric image.

10. The image processing apparatus as defined in claim 1, wherein the image input is configured to provide differential phase contrast computed tomography images, wherein one of the first image and the second image is indicative of the absorption of the object and the other of the first image and the second image is indicative of a phase shift of radiation, which traverses the object, induced by the object.

11. An image processing method filtering an image, said method comprising
obtaining a first and a second image of the same object, the first and second images comprising a plurality of voxels and being interrelated by a noise covariance, each voxel having a voxel value including a signal value and a noise value,
joint bilateral filtering the first image, wherein a first voxel of the first image is filtered by a filter function including a relative voxel-specific weight, said weight including a likelihood of obtaining the voxel values of said first voxel and a second voxel in the first image and of a first voxel and a second voxel in the second image, assuming that the signal value of said first voxel of the first image is identical to the signal value of a second voxel of the first image and that the signal value of the first voxel of the second image is identical to the signal value of a second voxel of the second image, wherein said filter is configured to use a likelihood including a noise covariance matrix describing said noise covariance,
providing said filtered image.

12. The image processing method as claimed in claim 11, wherein said filter is configured to use a covariance matrix of the form $$C = \begin{pmatrix} c_{11} & c_{12} & c_{13} & c_{14} \\ c_{12} & c_{22} & c_{23} & c_{24} \\ c_{13} & c_{23} & c_{33} & c_{34} \\ c_{14} & c_{24} & c_{34} & c_{44} \end{pmatrix}$$

or $$C = \begin{pmatrix} c_{11} & c_{12} & c_{13} & c_{14} \\ c_{12} & c_{11} & c_{14} & c_{13} \\ c_{13} & c_{14} & c_{33} & c_{34} \\ c_{14} & c_{13} & c_{34} & c_{33} \end{pmatrix}.$$

13. The image processing method as claimed in claim 11, wherein said filter is configured to use a likelihood of the form $$p(a_i - a_j, b_i - b_j | a_i = a_j, b_i = b_j) \propto$$
$$\int_{-\infty}^{\infty}\int_{-\infty}^{\infty} \exp\left(\frac{1}{2}(n_1, \Delta_a - n_1, n_3, \Delta_b - n_3) S_{ij}(n_1, \Delta_a - n_1, n_3, \Delta_b - n_3)^T\right) dn_1 dn_3$$

S being the inverse of the covariance matrix,
$a_1$ and $a_2$ being the first and second voxel values of the first image,
$b_1$ and $b_2$ being the first and second voxel values of the second image, and
$\Delta_a = a_1 - a_2$, $\Delta_b = b_1 - b_2$.

14. The image processing method as claimed in claim 11, wherein said filter is configured to use a likelihood of the form $$p(\Delta_a, \Delta_b | a_1 = a_2, b_1 = b_2) \propto$$
$$F \exp\left(\frac{1}{4}(\Delta_a^2(s_{12} - s_{11}) + 2\Delta_a\Delta_b(s_{14} - s_{13}) + \Delta_b^2(s_{34} - s_{33}))\right)$$

with $$F = \frac{\sqrt{\pi(s_{11} + s_{12})}}{\sqrt{(s_{11} + s_{12})(s_{33} + s_{34}) - (s_{13} + s_{14})^2}},$$

$$S = \begin{pmatrix} s_{11} & s_{12} & s_{13} & s_{14} \\ s_{12} & s_{11} & s_{14} & s_{13} \\ s_{13} & s_{14} & s_{33} & s_{34} \\ s_{14} & s_{13} & s_{34} & s_{33} \end{pmatrix},$$

S being the inverse of the covariance matrix,
$a_1$ and $a_2$ being the first and second voxel values of the first image,
$b_1$ and $b_2$ being the first and second voxel values of the second image, and
$\Delta_a = a_1 - a_2$, $\Delta_b = b_1 - b_2$.

15. The image processing method as claimed in claim 11, wherein the filtered first voxel value of the first image is obtained as $$\overline{a}_i = \frac{1}{N_i} \sum_{j \in N_i} a_j w_d(i,j) p(a_i - a_j, b_i - b_j | a_i = a_j, b_i = b_j)$$

with $$N_i = \sum_{j \in N_i} w_d(i,j) p(a_i - a_j, b_i - b_j | a_i = a_j, b_i = b_j)$$

and
$w_d$ is the distance weighting in bilateral filtering.

16. A non-transitory computer readable medium encoded with a program comprising computer executable instructions which when executed by a computer causes the computer to:
  obtain a first and a second image of the same object, the first and second images comprising a plurality of voxels and being interrelated by a noise covariance, each voxel having a voxel value including a signal value and a noise value,
  joint bilateral filter the first image, wherein a first voxel of the first image is filtered by a filter function including a relative voxel-specific weight, said weight including a likelihood of obtaining the voxel values of said first voxel and a second voxel in the first image and of a first voxel and a second voxel in the second image, assuming that the signal value of said first voxel of the first image is identical to the signal value of a second voxel of the first image and that the signal value of the first voxel of the second image is identical to the signal value of a second voxel of the second image, wherein said filter is configured to use a likelihood including a noise covariance matrix describing said noise covariance,
  provide said filtered image.

17. The non-transitory computer readable medium as claimed in claim 16, wherein said filter is configured to use a covariance matrix of the form $$C = \begin{pmatrix} c_{11} & c_{12} & c_{13} & c_{14} \\ c_{12} & c_{22} & c_{23} & c_{24} \\ c_{13} & c_{23} & c_{33} & c_{34} \\ c_{14} & c_{24} & c_{34} & c_{44} \end{pmatrix}$$

or $$C = \begin{pmatrix} c_{11} & c_{12} & c_{13} & c_{14} \\ c_{12} & c_{11} & c_{14} & c_{13} \\ c_{13} & c_{14} & c_{33} & c_{34} \\ c_{14} & c_{13} & c_{34} & c_{33} \end{pmatrix}.$$

18. The non-transitory computer readable medium as claimed in claim 16, wherein said filter is configured to use a likelihood of the form $$p(a_i - a_j, b_i - b_j \mid a_i = a_j, b_i = b_j) \propto$$
$$\int_{-\infty}^{\infty}\int_{-\infty}^{\infty} \exp\left(\frac{1}{2}(n_1, \Delta_a - n_1, n_3, \Delta_b - n_3) S_{ij}(n_1, \Delta_a - n_1, n_3, \Delta_b - n_3)^T\right) dn_1 dn_3$$

S being the inverse of the covariance matrix,
$a_1$ and $a_2$ being the first and second voxel values of the first image,
$b_1$ and $b_2$ being the first and second voxel values of the second image, and
$\Delta_a = a_1 - a_2$, $\Delta_b = b_1 - b_2$.

19. The non-transitory computer readable medium as claimed in claim 16, wherein said filter is configured to use a likelihood of the form $$p(\Delta_a, \Delta_b \mid a_1 = a_2, b_1 = b_2) \propto$$
$$F \exp\left(\frac{1}{4}(\Delta_a^2(s_{12} - s_{11}) + 2\Delta_a\Delta_b(s_{14} - s_{13}) + \Delta_b^2(s_{34} - s_{33}))\right)$$

with $$F = \frac{\sqrt{\pi(s_{11} + s_{12})}}{\sqrt{(s_{11} + s_{12})(s_{33} + s_{34}) - (s_{13} + s_{14})^2}},$$

$$S = \begin{pmatrix} s_{11} & s_{12} & s_{13} & s_{14} \\ s_{12} & s_{11} & s_{14} & s_{13} \\ s_{13} & s_{14} & s_{33} & s_{34} \\ s_{14} & s_{13} & s_{34} & s_{33} \end{pmatrix},$$

S being the inverse of the covariance matrix,
$a_1$ and $a_2$ being the first and second voxel values of the first image,
$b_1$ and $b_2$ being the first and second voxel values of the second image, and
$\Delta_a = a_1 - a_2$, $\Delta_b = b_1 - b_2$.

20. The non-transitory computer readable medium as claimed in claim 16, wherein the filtered first voxel value of the first image is obtained as $$\bar{a}_i = \frac{1}{N_i} \sum_{j \in N_i} a_j w_d(i, j) p(a_i - a_j, b_i - b_j \mid a_i = a_j, b_i = b_j)$$

with $$N_i = \sum_{j \in N_i} w_d(i, j) p(a_i - a_j, b_i - b_j \mid a_i = a_j, b_i = b_j)$$

and
$w_d$ is the distance weighting in bilateral filtering.

* * * * *